April 22, 1930.  H. K. DOWDY  1,755,774
BOLL WEEVIL CATCHER
Filed Jan. 15, 1927  2 Sheets-Sheet 1
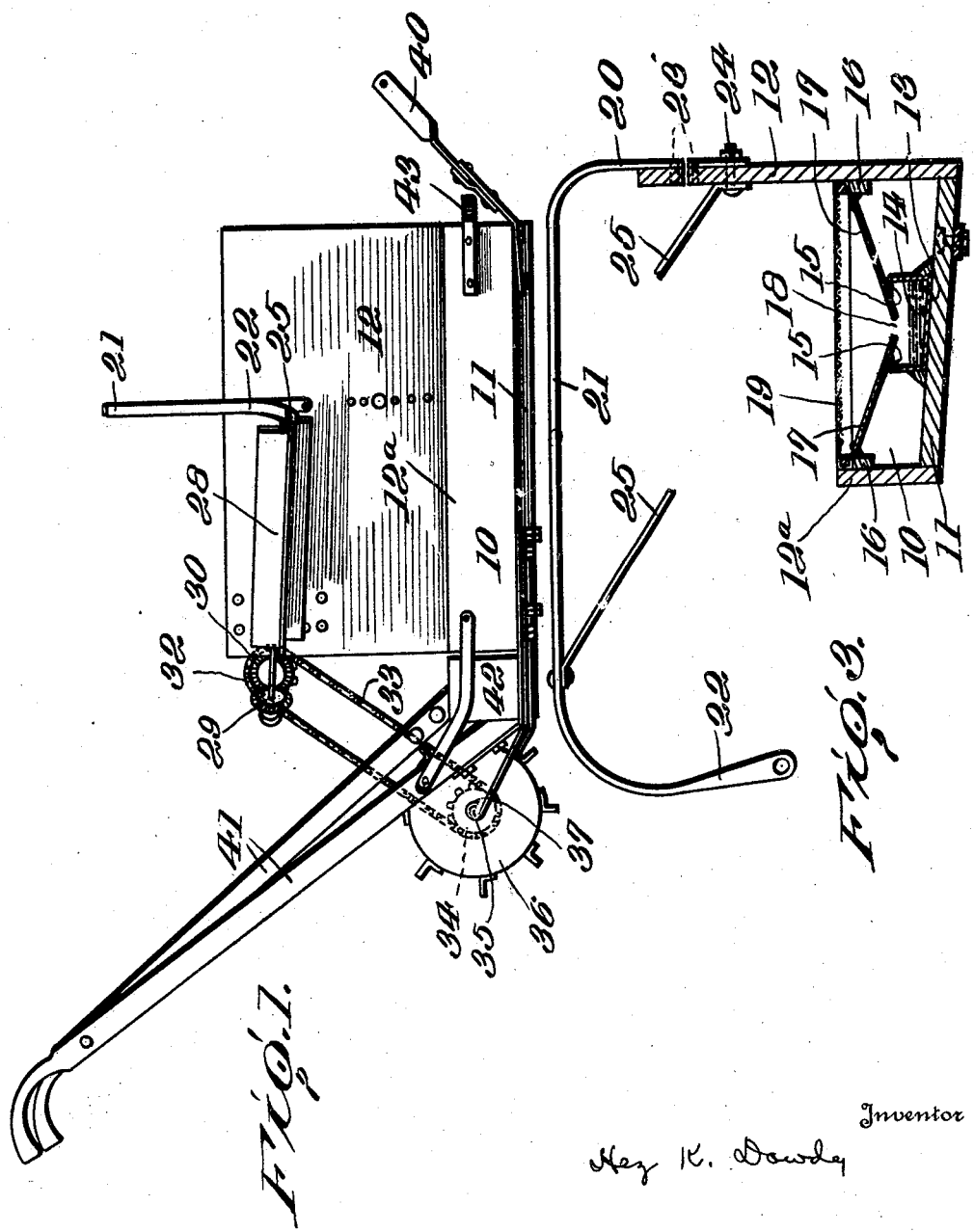

April 22, 1930.                H. K. DOWDY                 1,755,774
                           BOLL WEEVIL CATCHER
                         Filed Jan. 15, 1927          2 Sheets-Sheet 2
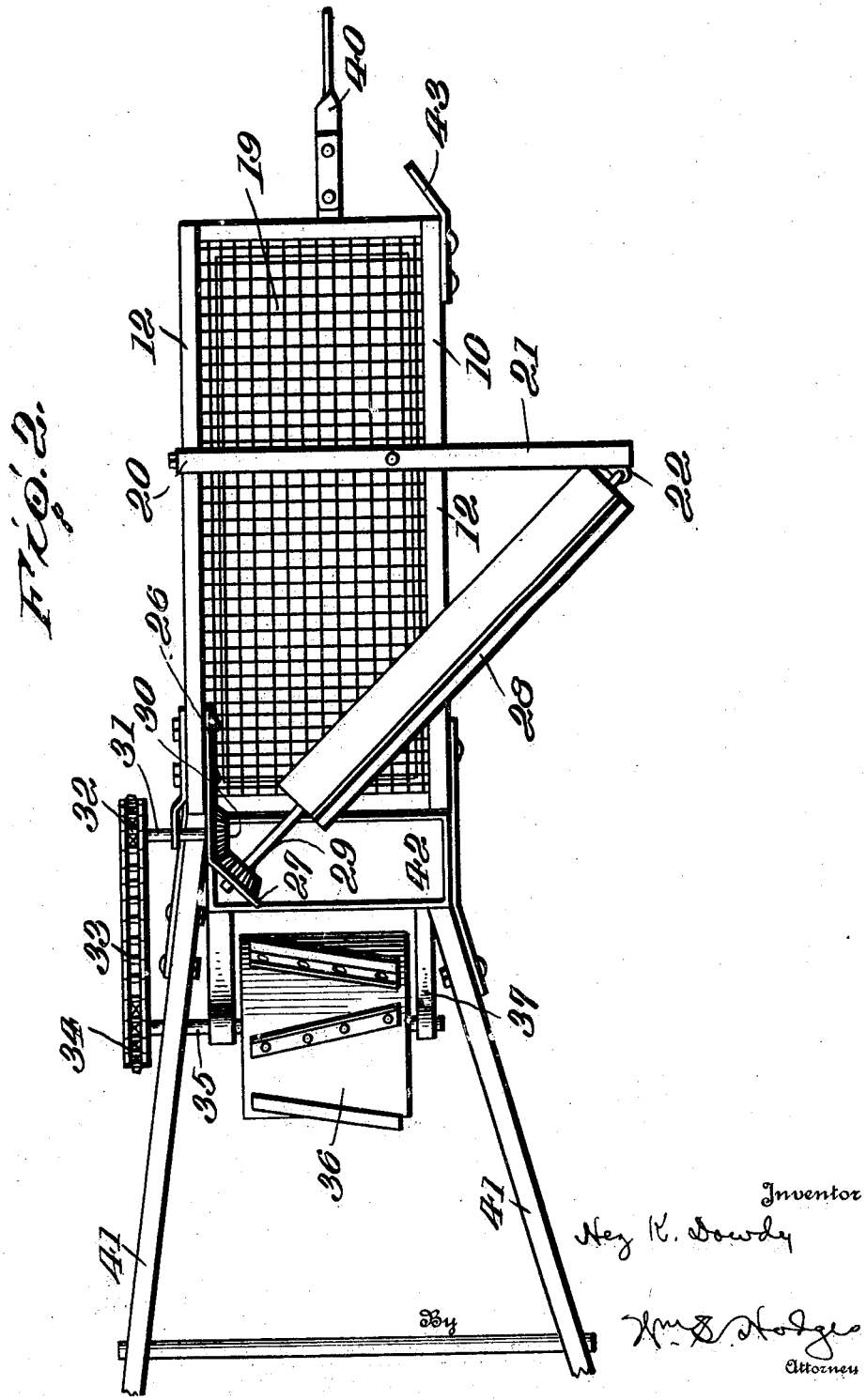
Inventor
Hez K. Dowdy
By
Attorney Patented Apr. 22, 1930

1,755,774

UNITED STATES PATENT OFFICE

HEZAKIAH K. DOWDY, OF CORDELE, GEORGIA

BOLL-WEEVIL CATCHER

Application filed January 15, 1927. Serial No. 161,380.

This invention is a device for trapping and exterminating boll weevils and other similar insects.

One of the objects of the invention is to provide a receptacle of a size which will permit it to be drawn beneath growing plants, and provided with simple means for gently agitating the plants so as to shake the insects therefrom. A further object is to provide such a receptacle having means for carrying a pan, or the like containing a lethal liquid, and cover means capable of permitting the insects to readily pass therethrough but so constructed as to prevent the passage of leaves, squares and the like. A further object is to provide means for catching leaves, squares and the like in such a manner that they may be brushed into a storage compartment during progress of the receptacle beneath the plants. A further object is to provide a receptacle of the character mentioned, which is equipped with means to pulverize or cultivate the soil contiguous to the plants.

The invention will be herein after fully set forth and particularly pointed out in the claims.

In the accompanying drawings:—

Figure 1 is a side elevation illustrating a boll weevil catcher constructed in accordance with the invention. Figure 2 is a top plan view thereof. Figure 3 is a transverse sectional view.

Referring to the drawings, 10 designates a receptacle having an inclined bottom 11, one of its sides 12 being of greater height than the other side 12ª. Located within the receptacle and resting on the bottom thereof is a pan 13, containing a lethal liquid 14, such as kerosene or any other material which is known to have death-dealing properties with respect to insects. As shown, the side walls of the pan are provided with flanges 15 which overhang the interior of the pan, and prevent slopping or splashing of the liquid during the travel of the receptacle.

Secured to the sides of the receptacle are cleats 16, to which are secured the outer edges of inclined floor plates 17. These plates extend inwardly and downwardly, so that their inner edges project over the flanges 15, said inner edges being spaced from each other to provide a slot or opening 18, through which the insects may drop into the liquid contained in pan 13. Resting upon the cleats 16 are the frame bars of a screen or cover 19, the mesh of the screen being sufficiently large to permit boll weevils and other similar insects to drop therethrough, onto the floors 17, but of a size to prevent the passage of leaves, punctured squares, and the like.

Secured to the side 12 is the supporting arm 20, of a bow 21, which overhangs the receptacle 10, and is provided at its free end with a downwardly extended bearing arm 22. The elevation of the bow with respect to the receptacle may be varied at will, the side 12 being provided with perforations 23 aligned to receive the securing bolts 24 by means of which the bow is retained in position. If necessary, a brace 25 may be provided.

Secured to the side 12 to the rear of the bow 21 is a bearing member 26, provided with an offset portion 27, and rotatably mounted in said offset portion 27 and the bearing arm 22 is a reel 28. Said reel is provided with a pinion 29, meshing with a gear 30, secured to a shaft 31, carrying a sprocket wheel 32, which is driven by means of a chain 33, engaging a drive sprocket 34, secured to the shaft 35, of a traction wheel 36, which is mounted in suitable bearings 37 at the rear of the receptacle.

The receptacle may be drawn along the ground in any suitable manner, a draft bar 40 being provided for this purpose, to which a draft animal may be hitched in any well known way. At the rear end, the receptacle is provided with handles 41 by means of which it may be conveniently guided, and a box 42 is provided contiguous to the rear end of the receptacle, between the handle, to receive the punctured squares which may be brushed off of the screen 19 by the leaves of the growing plants, as the receptacle passes beneath them. For the purpose of cultivating or pulverizing the ground contiguous to the rows, the forward right hand corner of the receptacle is provided with a scraper 43.

In operation, the receptacle is drawn along beside the drills, the low side coming next to the growing plants, and said receptacle is easily guided by means of the handles at the rear. As the receptacle is drawn forward, the bow 21 bends over the growing plants, which are brought into engagement with the reel 28. By reason of the diagonal setting of the reel over the drill, the plants are successively bent over the receptacle, and as the reel revolves, it gently shakes the cotton plants causing the boll weevils to drop off; it being a well known characteristic of the boll weevil that the instant it is disturbed it will fold up its legs and drop to the ground. As the weevils fall they drop upon and pass through the screen 19, and are directed by the floors 17 into the liquid contained in the pan 13, which quickly kills them. Any leaves, punctured squares, or the like which may be dislodged from the plants as the receptacle passes, also fall upon the screen 19, but being too large to pass therethrough, they are brushed backwardly by the leaves of the growing plants which are bent over by the reel, until they are swept into the receptacle or box 42, where they are stored until a convenient time to properly dispose of them. As the rear end of the machine is slightly elevated by reason of the mounting upon the traction wheel 36, the forward end has a tendency to scrape the ground, thereby affording sufficient cultivation to keep down weeds and grass, and pulverizing the soil without breaking any of the roots of the plants.

The advantages of the invention will be readily understood by those skilled in the art to which it belongs. It will be particularly noted that a very compact form of weevil exterminator has been provided, the same being so constructed that the tender plants may be gently bent over and agitated sufficiently to shake the weevils out of them without injury to the plants, in much the same manner as they would be handled manually. Another advantage is that the insects are positively directed into a lethal liquid; and all squares and leaves are gathered up for future examination, so that they are not left upon the ground in the vicinity of the plants which have been treated. It will also be understood that by means of the invention the growing plants are not only freed of the insects, but the ground is pulverized and cultivated in a very beneficial manner.

Having thus explained the nature of the invention and described an operative manner of constructing and using the same, although without attempting to set forth all of the forms in which it may be made, or all of the forms of its use, what is claimed is:—

1. A boll weevil catcher comprising a receptacle capable of resting upon and being drawn over the ground in the vicinity of growing plants, a pan for containing a lethal liquid carried by said receptacle, a screen covering said receptacle, the mesh of said screen being sufficiently coarse to permit insects to pass therethrough, but fine enough to prevent passage of leaves, squares and the like, means between the screen and the pan for directing the insects into said pan, means for bending over the growing plants, and agitating means operated by movement of said receptacle for further bending said plants so as to cause them to sweep said screen clear of any accumulations of leaves, squares and the like.

2. A boll weevil catcher comprising a receptacle capable of resting upon and being drawn over the ground in the vicinity of growing plants, a lethal liquid pan carried by said receptacle, a screen extending over the top of said receptacle, the mesh of said screen being sufficiently coarse to permit the insects to pass therethrough, but fine enough to prevent the passage of leaves, squares and the like, downwardly inclined floors located beneath said screen and leading inwardly from the sides of the receptacle, said floors having their inner edges spaced apart and projecting over the sides of the pan, so as to direct insects which fall through the screen into said pan, said floors being located between the screen and the pan, means for bending over the growing plants, and agitating means operated by the movement of the receptacle for further bending said plants so as to sweep the screens clear of accumulations of leaves, squares and the like.

3. A boll weevil catcher comprising a receptacle capable of being moved contiguously to growing plants, a lethal liquid pan carried thereby, a screen covering said receptacle above said pan, an overhanging bow secured to one side of said receptacle, a bearing also secured to the same side of said receptacle but to the rear of said bow, a reel rotatably mounted in said bow and said bearing member; and means operated by movement of the receptacle for rotating said reel.

4. A boll weevil catcher comprising a receptacle capable of being moved contiguously to growing plants, a lethal liquid pan carried by said receptacle, a screen cover for said receptacle above said pan, a bow member secured to one side of the receptacle and having an overhanging portion provided with a bearing arm, a bearing member secured to said side but to the rear of said bow, a reel rotatably mounted in said bearing arm and said bearing member, and means operated by movement of the receptacle for rotating said reel.

5. A boll weevil catcher comprising a receptacle capable of being moved contiguously to growing plants, a lethal liquid pan carried by said receptacle, a screen covering said receptacle above said pan, one side of said receptacle being provided with a plurality of aligned holes, a bow member having an arm provided with holes positioned to register with the first mentioned holes, securing devices capable of being extended through registering holes of said side and said arm, a bearing arm carried by said bow member, a bearing member carried by the receptacle to the rear of said bow, a reel rotatably mounted in said bearing arm and said bearing member, and means operated by movement of the receptacle for rotating said reel.

6. A boll weevil catcher comprising a receptacle capable of being moved contiguously to growing plants, a lethal liquid pan within said receptacle, a screen covering said receptacle above said pan, a traction wheel supporting the rear end of said receptacle, the forward end of the receptacle resting upon the ground, so as to scrape the ground and pulverize the soil, a reel rotatably mounted above the receptacle and extending diagonally with respect thereto, and means operated by said traction wheel for rotating said reel, so that it will successively engage and bend the plants over the receptacle.

7. A boll weevil catcher comprising a receptacle capable of being moved contiguously to growing plants, a lethal liquid pan carried by said receptacle, a screen covering said receptacle above said pan, a traction wheel supporting the rear end of the receptacle in a position slightly elevated from the ground, the forward end of the receptacle resting on the ground, a box for punctured squares located between said traction wheel and the contiguous end of the receptacle, handle bars for guiding the receptacle, a diagonally disposed reel mounted above the receptacle, and means operated by said traction wheel for rotating said reel.

In testimony whereof I have hereunto set my hand.

HEZ. K. DOWDY.